United States Patent [19]
Furuta et al.

[11] Patent Number: 5,131,073
[45] Date of Patent: Jul. 14, 1992

[54] NEURON UNIT AND NEURON UNIT NETWORK

[75] Inventors: Toshiyuki Furuta; Hiroyuki Horiguchi; Hirotoshi Eguchi, all of Kanagawa, Japan

[73] Assignee: Ricoh Company, Ltd., Japan

[21] Appl. No.: 550,404

[22] Filed: Jul. 10, 1990

[30] Foreign Application Priority Data

Jul. 12, 1989 [JP] Japan .................................. 1-179629
Mar. 12, 1990 [JP] Japan .................................. 2-60739
Mar. 16, 1990 [JP] Japan .................................. 2-67937

[51] Int. Cl.$^5$ ............................................. G06F 15/18
[52] U.S. Cl. ..................................... 395/27; 307/201; 382/14
[58] Field of Search ................ 364/513, 807; 307/201; 382/14, 15; 395/27

[56] References Cited

U.S. PATENT DOCUMENTS

| | | | |
|---|---|---|---|
| 4,943,931 | 7/1990 | Allen .................................. | 364/513 |
| 4,950,917 | 8/1990 | Holler et al. ........................ | 307/201 |
| 4,951,238 | 8/1990 | Andes et al. ........................ | 364/807 |
| 4,994,982 | 2/1991 | Duranton et al. .................. | 364/513 |
| 5,004,932 | 4/1991 | Nejime ............................... | 307/201 |
| 5,008,833 | 4/1991 | Agranat et al. .................... | 364/513 |

FOREIGN PATENT DOCUMENTS 62-295188 12/1987 Japan .

OTHER PUBLICATIONS

Murray et al., "Asynchronous VLSI Neural Networks Using Pulse-Stream Arithmetic", *IEEE Journal of Solid-State Circuits,* vol. 23 N. Jun. 3,1988 pp. 689–97.

Murray, "Pulse Arithmetic in VLSI Neural Networks", *IEEE Micro, Dec. 1989, pp. 64–73.*

Ramacher et al., "WSI Architecture of Neurocomputer Module", 1990 *International Conference on Wafer-Scale Integration,* pp. 124–130.

Skubiszewski, "A Hardware Emulator for Binary Neural Networks", *INNC '90 Paris-International Neural Network Conference,* Jul. 9–13/90 pp. 555–558.

Yasunaga et al., "A Water Scale Integration Neular Network Utilizing Completely Digital Circuits", Proc. UCNN International Joint Conf. on Neural Networks, vol. 2 Jun. 18–22, 1989, pp. II-213–217.

Yuzo Hirai et al., "Design of a Completely Digital Neuro-Chip", Institute of Information Sciences and Electronics, University of Tsukuba, pp. 89-96.

*Primary Examiner*—Allen R. MacDonald
*Attorney, Agent, or Firm*—Mason, Fenwick & Lawrence

[57] ABSTRACT

A neuron unit simultaneously processes a plurality of binary input signals. The neuron unit includes input lines for receiving first and second input signals which undergo transitions with time, first and second memories for storing weighting coefficients, a first gate for successively obtaining a logical product of one of the first input signals and a corresponding one of the weighting coefficients read out from the first memory for each of the first input signals, a second gate for successively obtaining a logical product of one of the second input signals and a corresponding one of the weighting coefficients read out from the second memory for each of the second input signals, a third gate for obtaining a logical sum of logical products output from the first gate, a fourth gate for obtaining a logical sum of logical products output from the second gate, and an output part including an inverter for inverting the logical sum output from the fourth gate and a gate for obtaining one of a logical product and a logical sum of the logical sum output from the third gate and an inverted logical sum output from the inverter. This gate outputs an output signal of the neuron unit.

13 Claims, 8 Drawing Sheets

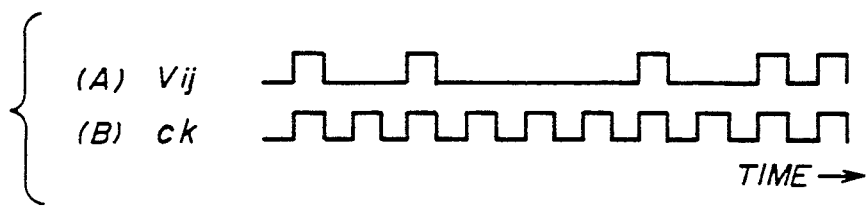
FIG.5  (A) Vij
       (B) ck
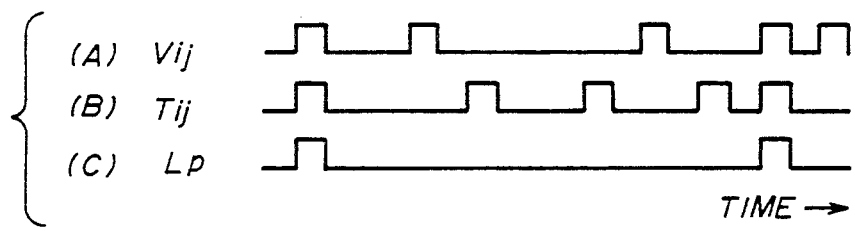
FIG.6  (A) Vij
       (B) Tij
       (C) Lp
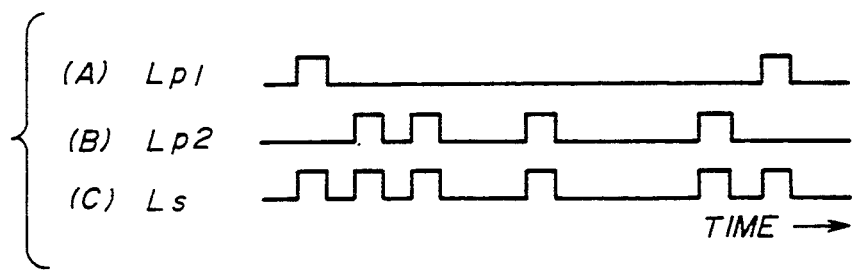
FIG.7  (A) Lp1
       (B) Lp2
       (C) Ls
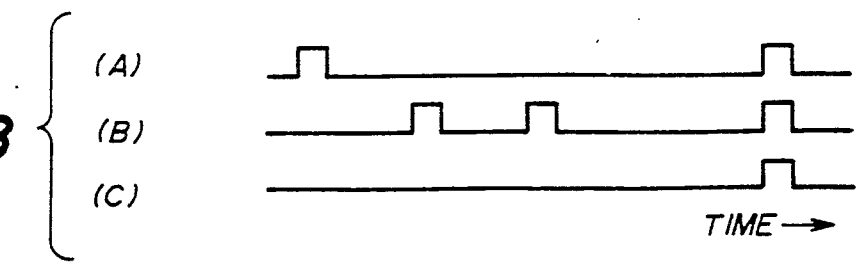
FIG.8  (A)
       (B)
       (C)

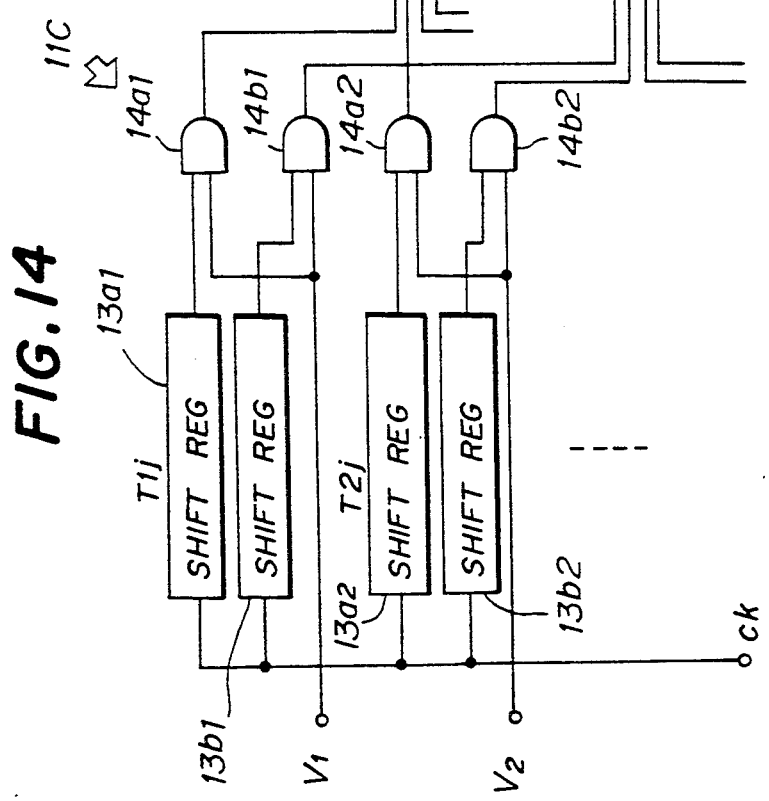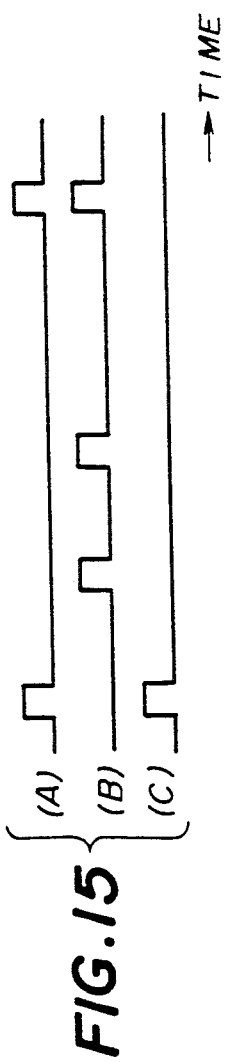

NEURON UNIT AND NEURON UNIT NETWORK

BACKGROUND OF THE INVENTION

The present invention generally relates to neuron units, and more particularly to a neuron unit which resembles neurons and is applicable to neural computers. The present invention also relates to a neuron unit network which includes a plurality of such neuron units which are coupled to form a hierarchical network structure.

Recently, in order to cope with relatively difficult problems encountered in conventional Von Neumann computers when carrying out character recognition, an associative storage, motion control and the like, various models of neural computers have been proposed. The neural computer resembles a nervous system of a living body so that it is possible to realize a parallel processing and a learning function. Various hardware models have also been proposed to realize the neural computer.

FIG. 1 shows an example of a conventional neuron unit proposed in a Japanese Laid-Open Patent Application No. 62-295188. The neuron unit includes a plurality of amplifiers 1 having an S-curve transfer function, and a resistive feedback circuit network 2 which couples outputs of each of the amplifiers 1 to inputs of amplifiers in another layer as indicated by a one-dot chain line. A time constant circuit 3 made up of a grounded capacitor and a grounded resistor is coupled to an input of each of the amplifiers 1. Input currents $I_1, I_2, \ldots, I_N$ are respectively applied to the inputs of the amplifiers 1, and an output is derived from a collection of output voltages of the amplifiers 1.

An intensity of the coupling (or weighting) between the nervous cells is described by a resistance of a resistor 4 (a lattice point within the resistive feedback circuit network 2) which couples the input and output lines of the nervous cells. A nervous cell response function is described by the transfer function of each amplifier 1. In addition, the coupling between the nervous cells may be categorized into excitation and inhibition couplings, and such couplings are mathematically described by positive and negative signs on weighting coefficients. However, it is difficult to realize the positive and negative values by the circuit constants. Hence, the output of the amplifier 1 is divided into two signals, and one of the two signals is inverted so as to generate a positive signal and a negative signal. One of the positive and negative signals derived from each amplifier 1 is appropriately selected.

FIG. 2 shows a modified version of the neuron unit shown in FIG. 1, and this modified version is proposed in a Japanese Laid-Open Patent Application No. 62-295188. In this case, the neuron unit is simplified based on a mathematical analysis. A negative gain amplifier 5 which produces a single output is used in place of the amplifier 1. In addition, a clipped T matrix circuit 6 is used in place of the resistive feedback circuit network 2.

The conventional neuron units shown in FIGS. 1 and 2 are analog circuits. In other words, the input and output quantities are described in current values or voltage values, and all operations within the circuits are carried out in analog form.

However, it is difficult to ensure accurate and stable operation of the analog circuit because the characteristics of the amplifier change depending on the temperature, a drift occurs during an initial stage of the circuit operation when the power source is turned ON and the like. Particularly in the case of the neuron unit, at least several hundred amplifiers are required, and operational stability is critical since a non-linear operation is carried out. In addition, it is difficult to change the circuit constants such as the resistances of the resistors, and the flexibility of the circuit for general applications is poor.

In view of the above, a digital neuron unit is proposed in Hirai et al., "Design of a Completely Digital Neuro-Chip", Technical Report of the Electronic Information and Communication Society, ICD88-130. But this digital neuron unit is simply an emulation of the conventional analog neuron unit, and the circuit construction of the digital neuron unit is quite complex in that up-down counters and the like are required. As a result, it is extremely difficult to provide a learning function in the digital neuro unit.

SUMMARY OF THE INVENTION

Accordingly, it is a general object of the present invention to provide a novel and useful neuron unit and a neuron unit network in which the problems described above are eliminated.

Another and more specific object of the present invention is to provide a neuron unit for simultaneously processing a plurality of binary input signals and for outputting an output signal which is indicative of a result of the processing, comprising a plurality of first input lines for receiving first binary input signals which undergo transitions with time, a plurality of second input lines for receiving second binary input signals which undergo transitions with time, first and second memory means for storing weighting coefficients, first gate means for successively obtaining a logical product of one of the first binary input signals received from the first input lines and a corresponding one of the weighting coefficients read out from the first memory means for each of the first binary input signals, second gate means for successively obtaining a logical product of one of the second binary input signals received from the second input lines and a corresponding one of the weighting coefficients read out from the second memory means for each of the second binary input signals, third gate means for obtaining a logical sum of logical products output from the first gate means, fourth gate means for obtaining a logical sum of logical products output from the second gate means, and output means including an inverter for inverting the logical sum output from the fourth gate means and a gate for obtaining one of a logical product and a logical sum of the logical sum output from the third gate means and an inverted logical sum output from the inverter, where the gate outputs an output signal of the neuron unit. According to the neuron unit of the present invention, it is possible to guarantee a stable circuit operation without being affected by a temperature change and the like. In addition, since the weighting coefficients are stored in the memory means, it is possible to rewrite the weighting coefficients if necessary.

Still another object of the present invention is to provide a neuron unit for simultaneously processing a plurality of binary input signals and for outputting an output signal which is indicative of a result of the processing, comprising a plurality of input lines for receiving binary input signals which undergo transitions with time, memory means for storing weighting coefficients and corresponding grouping information which indicates one of excitation and inhibition groups to which the weighting coefficients belong, first gate means for successively obtaining a logical product of one of the binary input signals received from the input lines and a corresponding one of the weighting coefficients read out from the first memory means for each of the binary input signals, second gate means for obtaining a logical product of one of the grouping information read out from the memory means and a corresponding one of logical products output from the first gate means for each of the logical products output from the first gate means, third gate means for obtaining a logical product of an inversion of one of the grouping information read out from the memory means and a corresponding one of the logical products output from the first gate means for each of the logical products output from the first gate means, fourth gate means for obtaining a logical sum of logical products output from the second gate means, fifth gate means for obtaining a logical sum of logical products output from the third gate means, and output means including an inverter for inverting the logical sum output from the fifth gate means and a gate for obtaining one of a logical product and a logical sum of the logical sum output from the fourth gate means and an inverted logical sum output from the inverter, where the gate outputs an output signal of the neuron unit.

A further object of the present invention is to provide a neuron unit for simultaneously processing a plurality of binary input signals and for outputting an output signal which is indicative of a result of the processing, comprising a plurality of input lines for receiving binary input signals which undergo transitions with time, first and second memory means for storing weighting coefficients, first gate means for successively obtaining a logical product of one of the binary input signals received from the input lines and a corresponding one of the weighting coefficients read out from the first memory means for each of the binary input signals, second gate means for successively obtaining a logical product of one of the binary input signals received from the input lines and a corresponding one of the weighting coefficients read out from the second memory means for each of the binary input signals, third gate means for obtaining a logical sum of logical products output from the first gate means, fourth gate means for obtaining a logical sum of logical products output from the second gate means, and output means including an inverter for inverting the logical sum output from the fourth gate means and a gate for obtaining one of a logical product and a logical sum of the logical sum output from the third gate means and an inverted logical sum output from the inverter, where the gate outputs an output signal of the neuron unit.

Another object of the present invention is to provide a neuron unit network comprising a plurality of neuron units which are coupled to form a hierarchical structure which has a plurality of layers, and a plurality of signal lines coupling outputs of arbitrary neuron units in one layer of the hierarchical structure to inputs of arbitrary neuron units in another layer of the hierarchical structure. Each of the neuron units simultaneously process a plurality of binary input signals and output an output signal which is indicative of a result of the processing. The neuron unit comprises a plurality of first input lines for receiving first binary input signals which undergo transitions with time, a plurality of second input lines for receiving second binary input signals which undergo transitions with time, first and second memory means for storing weighting coefficients, first gate means for successively obtaining a logical product of one of the first binary input signals received from the first input lines and a corresponding one of the weighting coefficients read out from the first memory means for each of the first binary input signals, second gate means for successively obtaining a logical product of one of the second binary input signals received from the second input lines and a corresponding one of the weighting coefficients read out from the second memory means for each of the second binary input signals, third gate means for obtaining a logical sum of logical produces output from the first gate means, fourth gate means for obtaining a logical sum of logical products output from the second gate means, and output means including an inverter for inverting the logical sum output from the fourth gate means and a gate for obtaining one of a logical product and a logical sum of the logical sum output from the third gate means and an inverted logical sum output from the inverter, where the gate outputs an output signal of the neuron unit. According to the neuron unit network of the present invention, the circuit construction of the neuron unit network is relatively simple because each neuron unit has a simple circuit construction.

Still another object of the present invention is to provide a neuron unit network comprising a plurality of neuron units which are coupled to form a hierarchical structure which has a plurality of layers, and a plurality of signal lines coupling outputs of arbitrary neuron units in one layer of the hierarchical structure to inputs of arbitrary neuron units in another layer of the hierarchical structure. Each of the neuron units simultaneously process a plurality of binary input signals and output an output signal which is indicative of a result of the processing. The neuron unit comprises a plurality of input lines for receiving binary input signals which undergo transitions with time, memory means for storing weighting coefficients and corresponding grouping information, the grouping information indicating one of excitation and inhibition groups to which the weighting coefficients belong, first gate means for successively obtaining a logical product of one of the binary input signals received from the input lines and a corresponding one of the weighting coefficients read out from the first memory means for each of the binary input signals, second gate means for obtaining a logical product of one of the grouping information read out from the memory means and a corresponding one of logical products output from the first gate means for each of the logical products output from the first gate means, third gate means for obtaining a logical product of an inversion of one of the grouping information read out from the memory means and a corresponding one of the logical products output from the first gate means for each of the logical products output from the first gate means, fourth gate means for obtaining a logical sum of logical products output from the second gate means, fifth gate means for obtaining a logical sum of logical products output from the third gate means, and output means including an inverter for inverting the logical sum output from the fifth gate means and a gate for obtaining one of a logical product and a logical sum of the logical sum output from the fourth gate means and an inverted logical sum output from the inverter, where the gate outputs an output signal of the neuron unit.

A further object of the present invention is to provide a neuron unit network comprising a plurality of neuron units which are coupled to form a hierarchical structure which has a plurality of layers, and a plurality of signal lines coupling outputs of arbitrary neuron units in one layer of the hierarchical structure to inputs of arbitrary neuron units in another layer of the hierarchical structure. Each of the neuron units simultaneously process a plurality of binary input signals and output an output signal which is indicative of a result of the processing. The neuron unit comprises a plurality of input lines for receiving binary input signals which undergo transitions with time, first and second memory means for storing weighting coefficients, first gate means for successively obtaining a logical product of one of the binary input signals received from the input lines and a corresponding one of the weighting coefficients read out from the first memory means for each of the binary input signals, second gate means for successively obtaining a logical product of one of the binary input signals received from the input lines and a corresponding one of the weighting coefficients read out from the second memory means for each of the binary input signals, third gate means for obtaining a logical sum of logical products output from the first gate means, fourth gate means for obtaining a logical sum of logical products output from the second gate means, and output means including an inverter for inverting the logical sum output from the fourth gate means and a gate for obtaining one of a logical product and a logical sum of the logical sum output from the third gate means and an inverted logical sum output from the inverter, where the gate outputs an output signal of the neuron unit.

Other objects and further features of the present invention will be apparent from the following detailed description when read in conjunction with the accompanying drawings:

BRIEF DESCRIPTION OF THE DRAWINGS

FIGS. 5 through 8 are timing charts for explaining the operation of the first and second embodiments;

FIG. 14 is a circuit diagram generally showing a third embodiment of the neuron unit according to the present invention;

FIG. 15 is timing charts for explaining the operation of the third embodiment; and FIG. 16 is a circuit diagram showing an essential part of a modification of the third embodiment.

DESCRIPTION OF THE PREFERRED EMBODIMENTS

Figure 1:
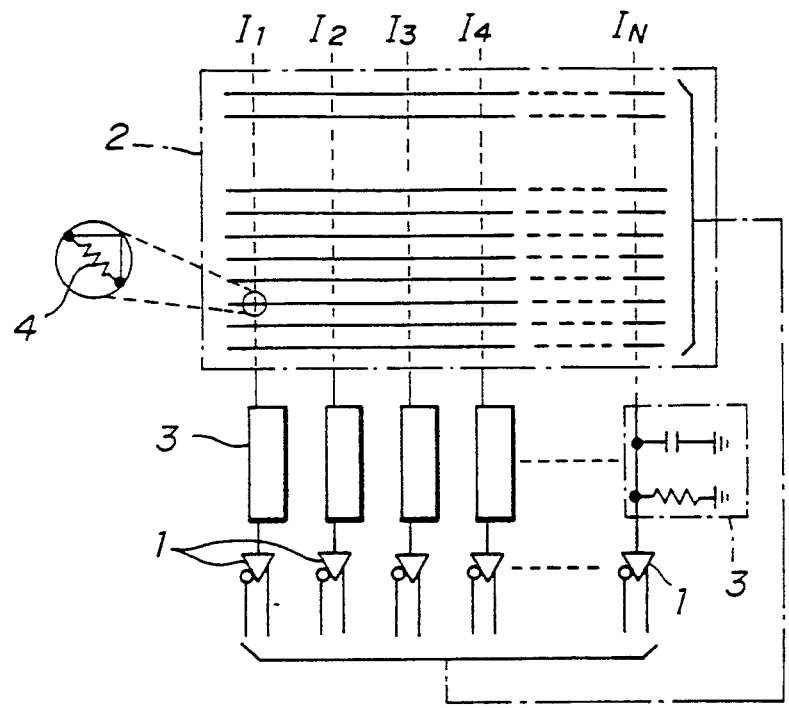
FIG. 1 is a circuit diagram generally showing an example of a conventional analog neuron unit.
Figure 2:
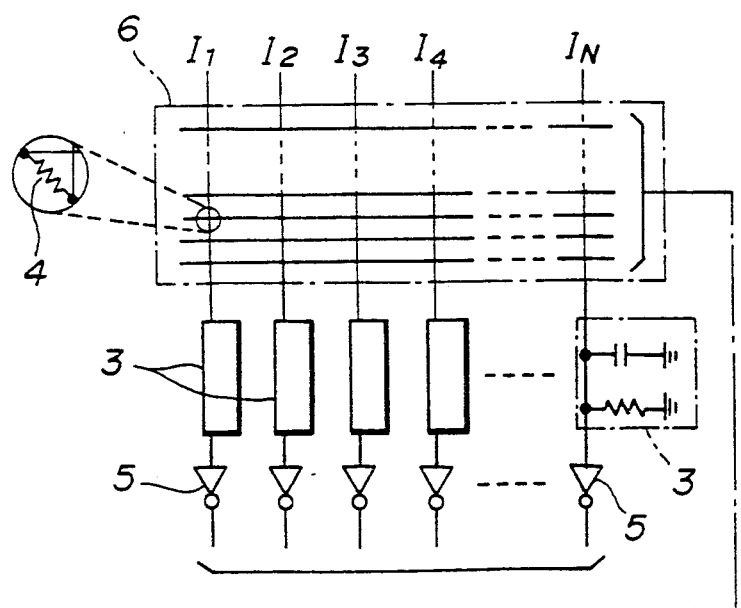
FIG. 2 is a circuit diagram generally showing another example of a conventional analog neuron unit.
Figure 3:
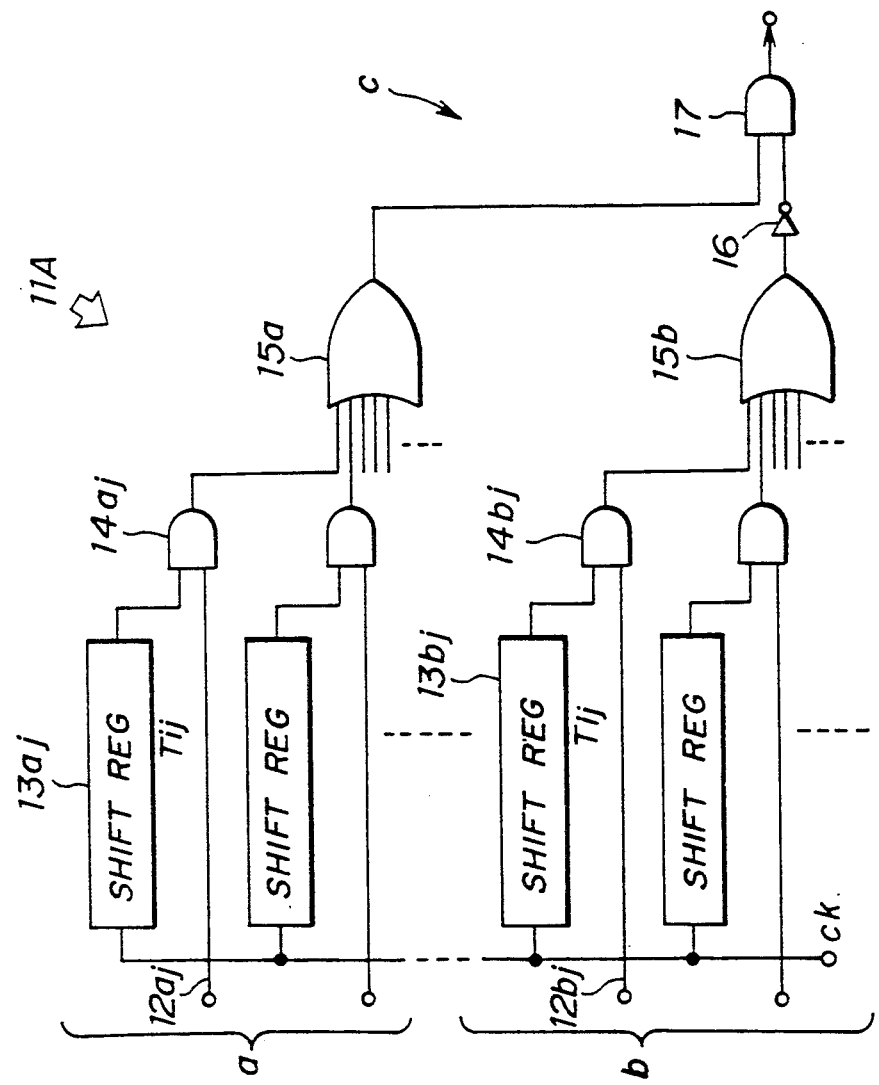
FIG. 3 is a circuit diagram generally showing a first embodiment of a neuron unit according to the present invention.
Figure 4:
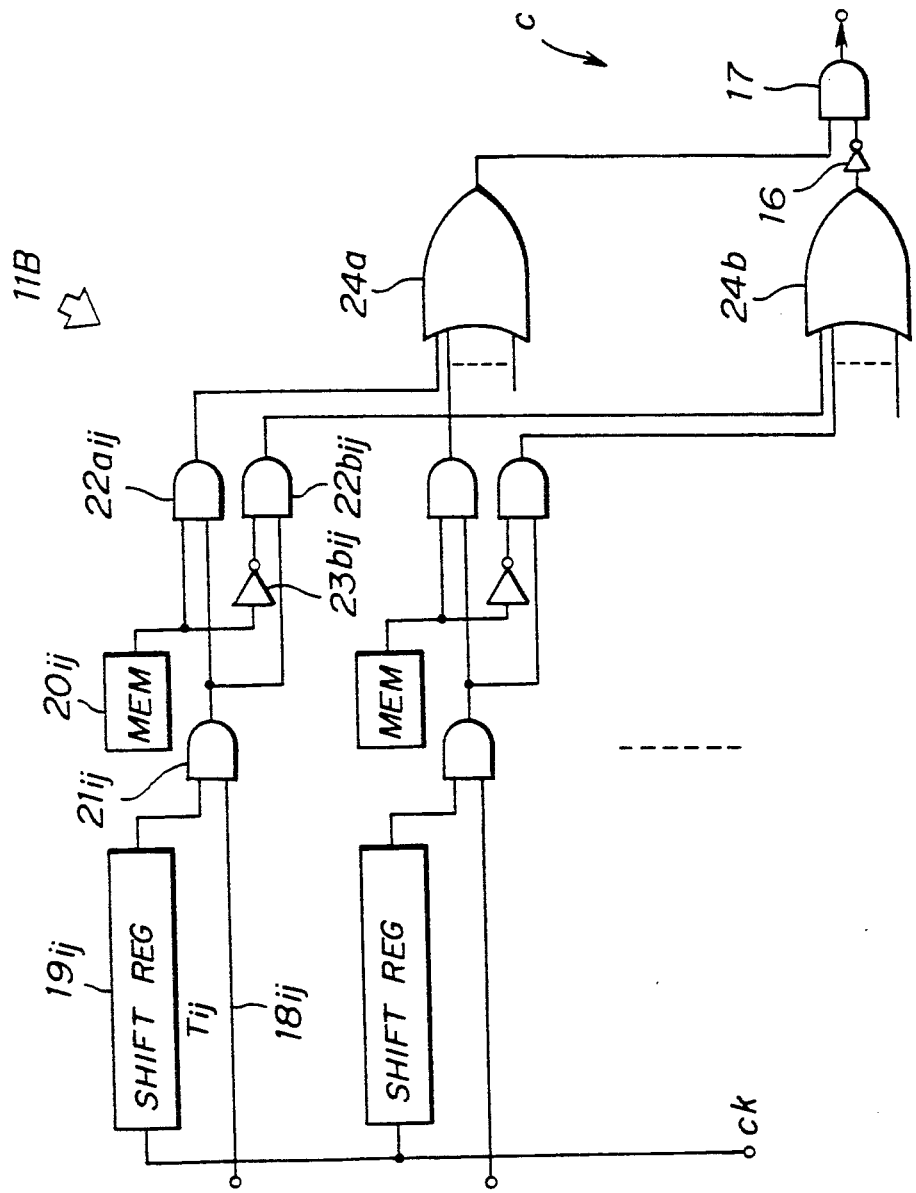
FIG. 4 is a circuit diagram generally showing a second embodiment of the neuron unit according to the present invention.

A description will be first given of circuit constructions of first and second embodiments of a neuron unit according to the present invention, by referring to FIGS. 3 and 4.

FIG. 3 shows the first embodiment. In FIG. 3, a neuron unit 11A resembles nervous cells and generally has an excitation group a, an inhibition group b and an output part c.

The excitation group a includes a plurality of input lines $12a_j$, a plurality of shift registers $13a_j$ which are provided independently for each of the input lines $12a_j$ to store weighting coefficients $T_{ij}$, AND gates $14a_j$ for successively calculating logical products of the input contents from the input lines $12a_j$ and the contents of the shift registers $13a_j$, and an OR gate $15a$ for successively calculating a logical sum of the logical products output from the AND gates $14a_j$.

Similarly, the inhibition group b includes a plurality of input lines $12b_j$, a plurality of shift registers $13b_j$ which are provided independently for each of the input lines $12b_j$ to store weighting coefficients $T_{ij}$, AND gates $14b_j$ for successively calculating logical products of the input contents from the input lines $12b_j$ and the contents of the shift register $13b_j$, and an OR gate $15b$ for successively calculating a logical sum of the logical products output from the AND gates $14b_j$.

The shift registers $13a_j$ and $13b_j$ respectively function as memories having a storage capacity of two or more bits.

The output part c includes an inverter 16 which receives the logical sum output from the OR gate $15b$ of the inhibition group b, and an AND gate 17 which receives the logical sum output from the OR gate $15a$ of the excitation group a and an output of the inverter 16. The AND gate 17 successively calculates a logical product of the inversion of the logical sum output from the inhibition group b and the logical sum output from the excitation group a.

The operation of the first embodiment will be described later.

FIG. 4 shows the second embodiment. A neuron unit 11B resembles nervous cells and generally has a plurality of input lines $18_{ij}$, a plurality of shift registers $19_{ij}$ for storing weighting coefficients $T_{ij}$, a plurality of 1-bit memories $20_{ij}$ for storing 1-bit group dividing information, AND gates $21_{ij}$ for successively calculating logical products of the input signal contents from the input lines $18_{ij}$ and the contents of the shift registers $19_{ij}$, AND gates $22a_{ij}$ for successively passing the logical products which are obtained from the AND gates $21_{ij}$ and belong to the excitation group depending on the contents of the memories $20_{ij}$, inverters $23b_{ij}$ and AND gates $22b$ for successively passing the logical products which are obtained from the AND gates $21_{ij}$ and belong to the inhibition group depending on the contents of the memories $20_{ij}$, an OR gate $24a$ for successively calculating a logical sum of the logical products which are obtained from the AND gates $22a_{ij}$ for the excitation group, an OR gate $24b$ for successively calculating a logical sum of the logical products which are obtained from the AND gates $22b_{ij}$ for the inhibition group, and the output part c.

The shift register $19_{ij}$ and the memory $20_{ij}$ together function as a memory for storing three or more bits of information. The output part c has a structure identical to that of the first embodiment. The AND gate 17 of the output part c successively calculates a logical product of the inversion of the logical sum output from the OR gate 24b for the inhibition group and the logical sum output from the OR gate 24a for the excitation group.

In the first and second embodiments, the input and output signals are synchronized binary signals. For example, the signals have a binary value "0" or "1". The quantity of an input signal $V_{ij}$ is described by a pulse density, that is, a number of "1"s within a predetermined time. FIGS. 5(A) and 5(B) respectively show the input signal $V_{ij}$ and a synchronizing clock signal ck for a case where information "0.5" is described by the input signal $V_{ij}$. In this case, there are five "1"s and five "0"s within a predetermined time amounting to ten pulses of the synchronizing clock signal ck. It is desirable that the "1"s and "0"s of the input signal $V_{ij}$ are arranged at random.

On the other hand, the weighting coefficient $T_{ij}$ is also described by the pulse density. The weighting coefficient $T_{ij}$ is prestored in the shift registers $13a_j$, $13b_j$ and $19_{ij}$ as a bit sequence of "0"s and "1"s. For example, a binary bit sequence "1001010110" indicates 0.5, and it is desirable that the "0"s and "1"s are arranged at random. The particular method of determining the random arrangement will be described later.

The binary bit sequence which corresponds to the weighting coefficient $T_{ij}$ is successively read out from the shift registers $13a_j$ and $13b_j$ (or the shift register $19_{ij}$) and is supplied to the AND gates $14a_j$ and $14b_j$ (or the AND gates $21_{ij}$) which respectively obtain the logical product of the input pulse sequence and the binary bit sequence which corresponds to the weighting coefficient $T_{ij}$. Accordingly, the input to the neuron unit 11 which corresponds to an arbitrary ith neuron is defined. That is, when the input signal $V_{ij}$ having the input pulse sequence "1010001011" shown in FIG. 6(A) is input and the binary bit sequence "1001010110" of the weighting coefficient $T_{ij}$ shown in FIG. 6(B) is read out from the shift registers $13a_j$ and $13b_j$ (or the shift registers $19_{ij}$) in synchronism with the input signal $V_{ij}$, a logical product Lp having a bit sequences "1000000010" shown in FIG. 6(C) is obtained from the AND gates $14a_j$ and $14b_j$ (or the AND gates $21_{ij}$). In this case, the input signal $V_{ij}$ is converted by the weighting coefficient $T_{ij}$ into a signal having a pulse density of 0.2. The output pulse density is by approximation a product of the pulse density of the input signal $V_{ij}$ and the pulse density of the weighting coefficient $T_{ij}$, and the weighting coefficient $T_{ij}$ has a function similar to that of the weighting coefficient used in the analog neuron unit. The output pulse density more closely approximates the product as the length of the signal sequences becomes longer and the arrangement of the "0"s and "1"s become more random. When the pulse sequence of the weighting coefficient $T_{ij}$ is shorter than the input pulse sequence of the input signal $V_{ij}$, it is possible to return to the beginning of the pulse sequence and repeat the read out of pulse sequence of the weighting coefficient $T_{ij}$.

One neuron unit 11 has a plurality of inputs. Hence, there are a plurality of logical products of the input signals $V_{ij}$ and the weighting coefficients $T_{ij}$, and the OR gates 15a and 15b (or 24a and 24b) obtain a logical sum of the logical products. Because the plurality of input signals $V_{ij}$ are synchronized, a logical sum Ls of the products becomes "1110100110" as shown in FIG. 7(C) when a first logical product Lp1 is "100000010" as shown in FIG. 7(A) and a second logical product Lp2 is "0110100100" as shown in FIG. 7(B), for example. The logical sum is obtained for each of the excitation group and the inhibition group. The logical sum of the logical products obtained for the excitation group and the logical sum of the logical products obtained for the inhibition group are calculated simultaneously. This calculation of the logical sums corresponds to the process of calculating the sum and the non-linear function (sigmoid function) in the conventional analog neuron unit.

As the pulse density becomes smaller, the logical sum of the pulse densities more closely approximates the sum of the pulse densities. However, as the pulse density becomes larger, the logical sum of the pulse densities saturates and less closely approximates the sum of the pulse densities and a non-linear characteristic is obtained. In the case of the logical sum, the pulse density will not become greater than "1" and will not become smaller than "0". In addition, the logical sum displays a monotonous increase and is approximately the same as the sigmoid function.

As described before, there are two types of couplings (or weighting), namely, the excitation and inhibition types. When making numerical calculations, the excitation and inhibition types are described by positive and negative signs on the weighting coefficient. In the case of the conventional analog neuron unit, when the weighting coefficient $T_{ij}$ is the inhibition type and the sign on the weighting coefficient $T_{ij}$ is negative, an inverting amplifier is used to make an inversion and a coupling to another neuron is made via a resistance which corresponds to the weighting coefficient $T_{ij}$.

On the other hand, in the first and second embodiments, the couplings are divided into the excitation group and the inhibition group depending on the positive and negative signs on the weighting coefficients. Then, the calculation up to the part where the logical sum of the input pulse sequence and the pulse sequence of the weighting coefficient is obtained is carried out for each group. Thereafter, a measure is taken so that the neuron unit 11 outputs "1" only when the output of the excitation group is "1" and the output of the inhibition group is "0".

This measure is realized by the output part c shown in FIGS. 3 and 4, that is, by obtaining a logical product of a negative of the output of the inhibition group and the output of the excitation group. As a result, it is possible to realize both the excitation type coupling and the inhibition type coupling by the digital neuron unit. FIG. 8(A) shows the output of the excitation group, FIG. 8(B) shows the output of the negative of the output of the inhibition group, and FIG. 8(C) shows the output of the neuron unit 11.

In the first and second embodiments, the shift registers $13a_j$, $13b_j$ and $19_{ij}$ are used, but it is possible to use instead a combination of a memory and a controller which are on the market.

In the first embodiment, the input stage is already divided into the excitation group and the inhibition group by providing the input lines $12a_j$ for the excitation group and the input lines $12b_j$ for the inhibition group. In other words, the relationship of the input and the coupling (or weighting) is fixed, and the logical products and logical sums are calculated for each group.

On the other hand, in the second embodiment, the 1-bit information which indicates either the excitation type or inhibition type coupling (or weighting) is prestored in each memory 20, and the appropriate calculation is selected depending on the information content of each memory 20. The selection of the appropriate calculation is simply realized by a logic circuit including the inverters $23_{ij}$ and the AND gates $22a_{ij}$ and $22b_{ij}$. Alternatively, a relay or the like may be used to select the appropriate calculation.

The description given heretofore relates to one neuron unit 11. However, in actual practice, a network is formed from a plurality of neuron units 11. For example, the neuron units 11 form a hierarchical network structure shown in FIG. 9 in which an output of one neuron unit 11 of one layer is coupled to each of the neuron units 11 of a next layer via signal lines L. When the network as a whole is synchronized, the same function may be utilized successively to carry out calculations.

Figure 10:
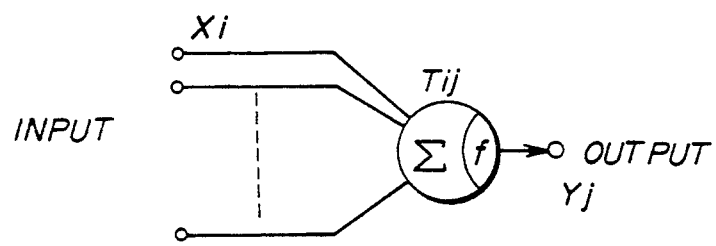
FIG. 10 shows a neuron model.

Next, a description will be given of a method of obtaining the weighting coefficient $T_{ij}$ of the network described above. FIG. 10 shows a neuron model (McCulloch Pitts model) which is often used in numerical calculations. The network described by this model is considered and the back propagation technique is applied thereto. First, the layer structure is made the same as that of the digital circuit by matching the number of layers and number of neurons in each layer. The input to the digital circuit is an analog value from "0" to "1". The weighting coefficient is a positive value in the case of the excitation group and is a negative value in the case of the inhibition group. The following set of formulas (1) is used to calculate the weighting coefficient for the neuron model shown in FIG. 10.

$$Y_j = f(\Sigma x_i T_{ij})$$
$$f(x) = 1/(1 + e^{-x}) \quad (1)$$

The weighting coefficient is successively calculated for each layer of the network to obtain a final output. The weighting coefficient is initially selected at random. An output $y_i$ is obtained when an input is applied to the digital circuit, and this output $y_i$ is compared with a desirable output $t_i$. The following set of formulas (2) is used to recalculate the weighting coefficient $T_{ij}$.

$$E = (\tfrac{1}{2})\Sigma(y_i - t_i)^2$$
$$\Delta T_{ij} = \delta E / \delta T_{ij} \quad (2)$$

The desired output is obtained when a certain input is applied to the digital circuit by repeating the above described operation. This operation is carried out beforehand on a computer, and the calculated weighting coefficient $T_{ij}$ is converted into a corresponding pulse density. As described above, it is desirable that the pulse intervals of the pulse sequence are at random. When obtaining the pulse sequence from the analog value, a random number is generated within the computer and this random number is compared with the analog value. For example, a value "1" is set when the random value is greater than the analog value and a value "0" is set when the random value is smaller than the analog value, and a desired pulse sequencer is obtained by repeating such an operation. The desired pulse sequence is then stored in the shift registers $13a_j$ and $13b_j$ (or the shift registers $19_{ij}$).

Alternatively, the weighting coefficient $T_{ij}$ may be obtained as follows. That is, in the case of the hierarchical network, the following formulas are used to determine the weighting coefficient $T_{ij}$. In this case, the weighting coefficient $T_{ij}$ is initially selected at random.

A) An error signal $\delta$ is calculated from an output obtained in a final output layer and an ideal output. Two error signals $\delta^+$ and $\delta^-$ are used to respectively indicate the positive and negative components of the error because the pulse density cannot take positive and negative values. In other words, the following set of formulas (3) are calculated, where y denotes the output obtained in the final output layer and d denotes the ideal output.

$$\delta^+ = (y \text{ XOR } d) \text{ AND } d$$
$$\delta^- = (y \text{ XOR } d) \text{ AND } y \quad (3)$$

B) The weighting coefficient $T_{ij}$ is newly obtained from the error signal $\delta$ using the following set of formulas (4).

$$\Delta T_{ij}^+ = \delta_i^+ \cap y_i \quad (4)$$
$$\Delta T_{ij}^- = \delta_i^- \cap y_i$$
$$T_{ij}(\text{NEW}) = T_{ij} \cup \Delta T_{ij}^+ \cap \overline{\Delta T_{ij}^-}$$
(For excitation group)
$$T_{ij}(\text{NEW}) = T_{ij} \cup \Delta T_{ij}^- \cap \overline{\Delta T_{ij}^+}$$
(For inhibition group)

C) An error signal which is used for the calculation in a previous layer is obtained from the error signal obtained in A) above using the following set of formulas (5).

$$GP_i = \delta_i^+ \cap T_{ij} \quad (5)$$
$$GM_i = \delta_i^- \cap T_{ij}$$
(For excitation group)
$$GP_i = \delta_i^- \cap T_{ij}$$
$$GM_i = \delta_i^+ \cap T_{ij}$$
(For inhibition group)

D) the error signal is obtained in the previous layer using the following set of formulas (6).

$$\delta_j^+ = \cup_k GP_k \quad (6)$$
$$\delta_j^- = \cup_k GM_k$$

E) Calculation similar to those of B) and C) above are carried out.

F) Furthermore, d and e are calculated in the previous layer and the same calculation is repeated to the first layer.

The above described calculations are repeated on the computer until the output y becomes the ideal output d, and the weighting coefficient $T_{ij}$ is finally obtained. The pulse sequence which corresponds to the obtained weighting coefficient $T_{ij}$ is stored in the shift registers $13a_j$ and $13b_j$ (or the shift registers $19_{ij}$).

On the other hand, the input data generally has an analog value in most cases. Hence, when converting the input data into a pulse sequence, a random number is generated from a random number generator similarly as described above, and the generated random number is compared with the analog value of the input data. A desired pulse sequence corresponding to the input data is obtained by generating a value "1" or "0" depending on whether the analog value is smaller than the random number. The output is also in the form of a pulse sequence, but a corresponding pulse density can be obtained by use of a counter or the like. Of course, the output may be output as it is in the form of the pulse sequence where preferable.

This embodiment describes the signal in the form of the pulse density, and this method of describing the signal is effective not only in actual circuits but also when simulating the circuit operation on the computer. In other words, the operations on the computer are carried out serially, but compared to the calculation of analog values, it is only possible to considerably improve the calculation speed because only logic operations need to be carried out on binary values "1" and "0". Generally, the operations on the four fundamental rules of arithmetics require a large number of machine cycles per calculation, but the logic operation of this embodiment requires only a small number of machine cycles. In addition, there is an additional advantage in that it is easier to use a low-level language for high-speed processing when only logic operations are required.

Figure 9:
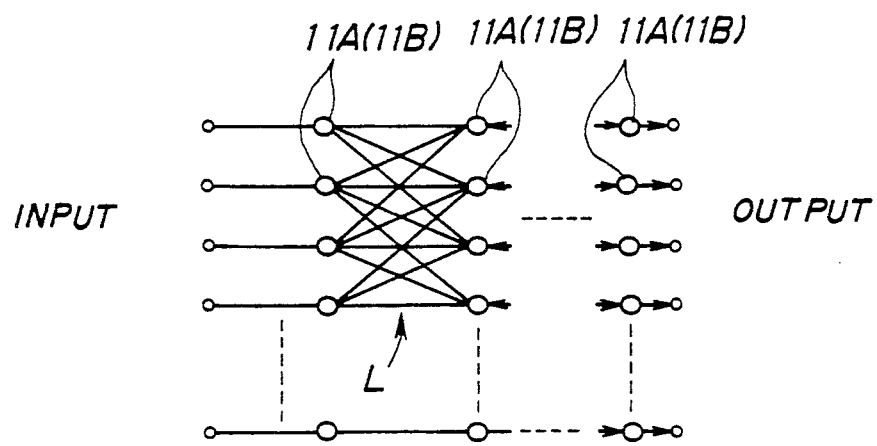
FIG. 9 shows a hierarchical network applied with the first and second embodiments.

Next, a description will be given of the second embodiment for a particular case where 128-bit shift registers are used for the shift registers $19_{ij}$. The content of the shift register $19_{ij}$ is used recursively. The 1-bit information stored in the memory $20_{ij}$ for each input indicates whether the input belongs to the excitation or inhibition group. The 1-bit information has a value "1" to indicate the inhibition group and a value "0" to indicate the excitation group. The neuron units 11B each having the structure shown in FIG. 4 are connected as shown in FIG. 9 to form a network. In this case, there are three layers in the network. A first layer on the input side has 256 neuron units 11B, an intermediate layer has 4 neuron units 11B, and a third layer on the output side has 5 neuron units 11B. In this 3-layer structure, all inputs and outputs of the neuron units 11B ar coupled between the first and second layers and between the second and third layers.

Figure 11:
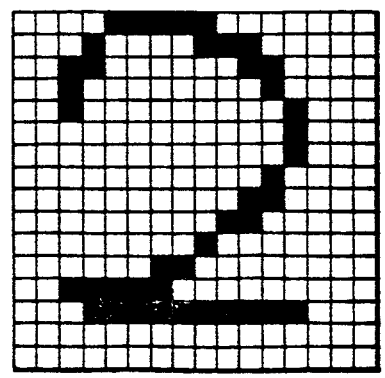
FIG. 11 shows a character which is read for making a character recognition using the second embodiment.

For example, the above described network was used for making a character recognition responsive to a handwritten character input. In this case, the weighting coefficient (content of the shift register $19_{ij}$) is obtained by a computer simulation in the following manner. First, a character shown in FIG. 11 is read by a scanner, and the read image is sectioned into 16×16 meshes. Each mesh including a portion of the character is described by a value "1" while each mesh including no portion of the character is described by a value "0". 256 data are input to the network, and a recognition result is obtained from one of the five neuron units 11B in the third layer which outputs a largest output. When the numbers "1" through "5" are input, the learning takes place so that the neuron unit 11B corresponding to the input number outputs the largest output.

Particularly, each weighting coefficient is obtained and the identification of the excitation coupling (weighting) and inhibition coupling (weighting) is made by the following procedure. First, the network structure including 256 neuron units 11B in the first layer, 4 neuron units 11B in the second layer and 5 neuron units 11B in the third layer is prepared by a computer simulation, and the same inputs are applied to the simulated network structure. Initially, when each weighting coefficient is selected at random, the output result does not necessarily become the desired output. Hence, the set of formulas (2) is used to newly obtain each weighting coefficient, and such an operation is repeated so that the desired output is obtained. An absolute value of the obtained weighting coefficient is converted into the pulse density by the procedure described above and the pulse density is stored in the shift register $19_{ij}$. Since the positive and negative signs on the weighting coefficient distinguish the excitation and inhibition groups, this information is stored in the memory $20_{ij}$. The input is "0" or "1" in this case, and the input pulse sequence has a low level or a high level, and there is no need to provide a special random number generator.

The final output from the third layer is coupled to a light emitting diode (LED) via a transistor, so that the LED turns OFF in response to a low-level output and turns ON in response to a high-level output. The frequency of the synchronizing clock signal ck is set to 1000 kHz, so that the brightness of the LED changes depending on the pulse density. To the human eye, the brightest LED corresponds to the recognition result. The network was used to recognize the characters which were sufficiently taught to the character recognition system on the computer simulation, and it was found that the recognition result obtained from the network was the same as the recognition result obtained by the computer simulation.

Figure 12:
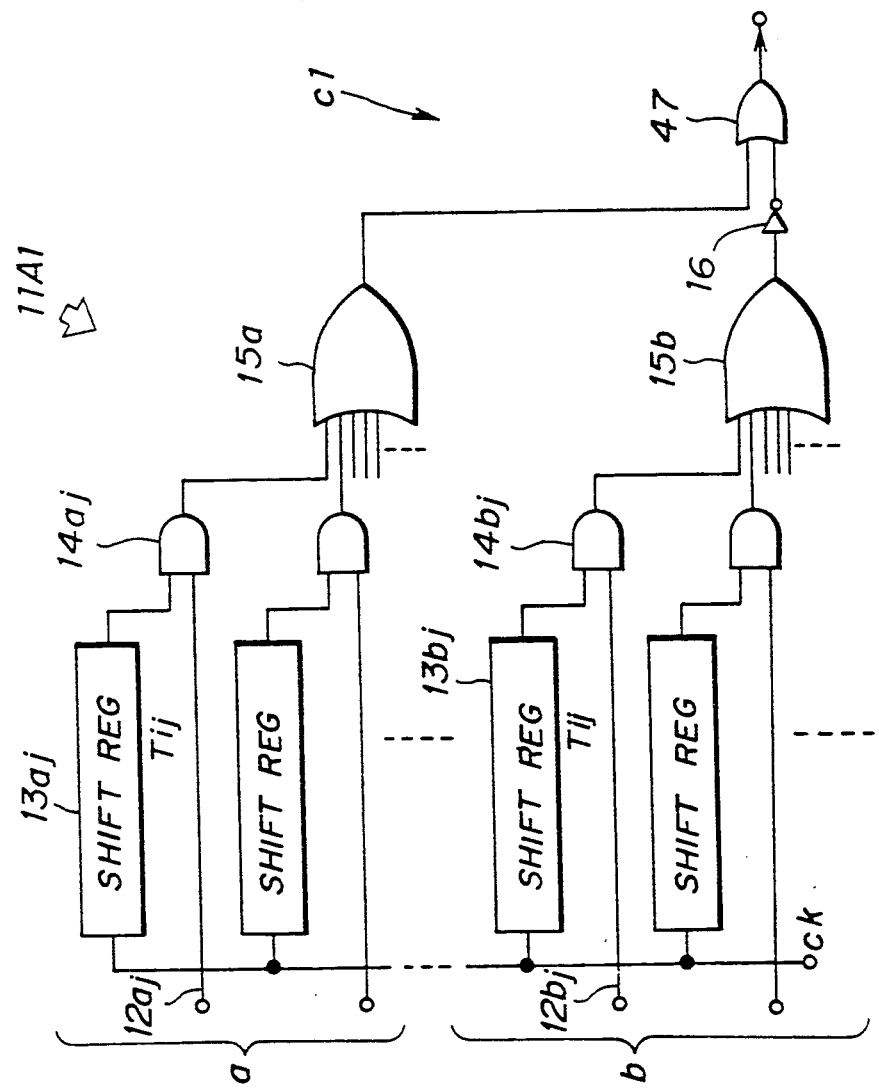
FIG. 12 is a circuit diagram generally showing modification of the first embodiment.

Next, a description will be given of a modification of the first embodiment, by referring to FIG. 12. In FIG. 12, those parts which are the same as those corresponding parts in FIG. 3 are designated by the same reference numerals, and a description thereof will be omitted. In a neuron unit 11A1, an OR gate 47 is provided in an output part c1 in place of the AND gate 17 of the output part c. In this modification, the OR gate 47 obtains a logical sum of the inverted logical sum of the excitation group obtained from the OR gate 15a and the logical sum of the inhibition group obtained from the OR gate 15b.

Figure 13:
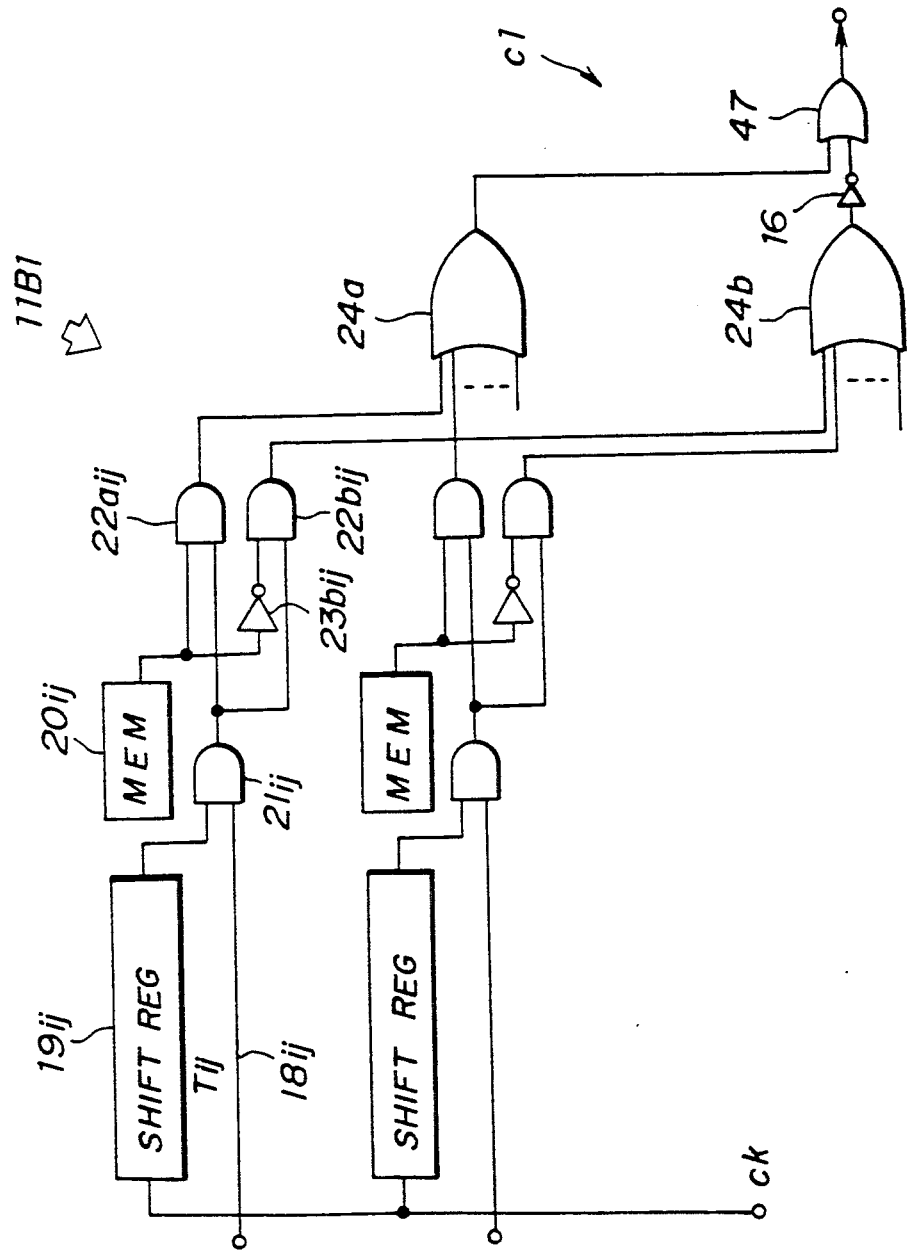
FIG. 13 is a circuit diagram generally showing a modification of the second embodiment.

FIG. 13 shows a modification of the second embodiment. In FIG. 13, those parts which are the same as those corresponding parts in FIG. 4 are designated by the same reference numerals, and a description thereof will be omitted. In a neuron unit 11B1, the output part c1 is used in place of the output part c, similarly to the modification of the first embodiment. In this modification, the OR gate 47 obtains a logical sum of the inverted logical sum of the excitation group obtained from the OR gate 24a and the logical sum of the inhibition group obtained from the OR gate 24b.

Next, a description will be given of a third embodiment of the neuron unit according to the present invention, by referring to FIG. 14. In FIG. 14, those parts which are substantially the same as those corresponding parts in FIG. 3 are designated by the same reference numerals, and a description thereof will be omitted.

In FIG. 14, input signals V1, V2, ... are described in pulse densities, that is, the number of "1"s within a predetermined time.

In a neuron unit 11C shown in FIG. 14, an output part c2 is made up of the inverter 16 and the AND gate 17. The inverter 16 inverts the logical sum output from the OR gate 15b for the inhibition group. The AND gate 17 obtains a logical product of the logical sum output from the OR gate 15a for the excitation group and an inverted logical sum output from the inverter 16.

The basic operation of this embodiment can be readily understood from the operation of the first embodiment. In this embodiment, however, as shown in FIG. 15(C), the output part c2 is designed to output a value "1" and only when the logical sum output from the OR gate 15a shown in FIG. 15(A) is "1" and the logical sum output from the OR gate 15b shown in FIG. 15(B) is "0". Otherwise, the output part c2 outputs a value "0" as shown i FIG. 15(C).

FIG. 16 shows an essential part of a modification of the third embodiment. In FIG. 16, an output part c3 is made up of the inverter 16 and the OR gate 47. The inverter 16 inverts the logical sum output from the OR gate 15b for the inhibition group. The OR gate 17 obtains a logical sum of the logical sum output from the OR gate 15a for the excitation group and an inverted logical sum output from the inverter 16. Hence, the output part c3 outputs a value "0" only when both outputs of the OR gate 15a and the inverter 16 are "0", and otherwise outputs a value 37 1".

Further, the present invention is not limited to these embodiments, but various variations and modifications may be made without departing from the scope of the present invention.

What is claimed is:

1. A neuron unit network comprising:
   (A) a plurality of neuron units which are coupled to form a hierarchical structure which has a plurality of layers; and
   (B) a plurality of signal liens coupling outputs of arbitrary neuron units in one layer of the hierarchical structure to inputs of arbitrary neuron units in another layer of the hierarchical structure, each of said neuron units simultaneously processing a plurality of binary input signals and outputting an output signal which is indicative of a result of the processing, said neuron unit including:
   a) a plurality of input lines connected to provide binary input signals which undergo transitions with time;
   b) memory means for storing:
      1) weighting coefficients; and
      2) corresponding grouping information, said grouping information indicating one of the excitation and inhibition groups to which said weighting coefficients belong;
   c) first digital gate means, responsive to said memory means and said input lines, for outputting logical product of:
      1) one of said binary input signals received from said input lines; and
      2) a corresponding one of the weighting coefficients from said first memory means;
   for each of said binary input signals;
   d) second digital gate means, responsive to said memory means, for outputting a logical product of:
      1) one of said grouping information from said memory means; and
      2) a corresponding one of logical products output from said first digital gate means;
   for each of the logical products output from said first digital gate means;
   e) third digital gate means, responsive to said memory means, for outputting a logical product of:
      1) an inversion of one of said grouping information from said memory means; and
      2) a corresponding one of the logical products output from said first digital gate means;
   for each of the logical products output from said first digital gate means;
   f) fourth digital gate means, responsive to second digital gate means, for outputting a logical sum of logical products output from said second digital gate means;
   g) fifth digital gate means, responsive to said third digital gate means, for outputting a logical sum of logical products output from said third digital gate means; and
   h) output means including:
      1) a digital inverter, responsive to said fifth digital gate means, for inverting the logical sum output from said fifth digital gate means; and
      2) a digital gate, responsive to said fourth digital gate means and said digital inverter, for outputting one of
         A) a logical product of; and
         B) a logical sum of
            i) the logical sum output from said fourth digital gate means; and
            ii) an inverted logical sum output from said digital inverter,
   said digital gate outputting the output signal of said neuron unit.

2. An apparatus including the neuron unit network as claimed in claim 1, comprising:
   means for providing said binary input signals which respectively describe a signal quantity in a form of a pulse density; and
   said memory means includes means for storing the weighting coefficients which respectively describe a signal quantity in a form of a pulse density.

3. The apparatus as claimed in claim 2 wherein the memory means includes means for storing each weighting coefficient having a pulse density defined by a number of first values and second values within a predetermined time, the first values and second values being arranged at random, and the first and second values respectively corresponding to high and low binary signal levels.

4. A neuron unit for simultaneously processing a plurality of input signals on a plurality of respective input lines, and for outputting on a neuron unit output a neuron unit output signal which is indicative of a result of the processing, the neuron unit comprising:
   a) the plurality of input lines;
   b) a plurality of first memory devices having respective first memory outputs;
   c) a plurality of second memory devices having respective second memory outputs;
   d) a plurality of first digital NOT circuits, connected to respective second memory outputs, and having respective first digital NOT outputs;
   e) a plurality of first digital AND circuits, connected to respective input lines and to respective first memory outputs, and having respective first digital AND outputs;
   f) a plurality of second digital AND circuits, connected to respective first digital AND outputs and to respective second memory outputs, and having respective second digital AND outputs;
   g) a plurality of third digital AND circuits, connected to respective first digital AND outputs and to respective first digital NOT outputs, and having respective third digital AND outputs;
   h) a first digital OR circuit, connected to the second digital AND outputs, and having a first digital OR output;
   i) a second digital OR circuit, connected to the third digital AND outputs, and having a second digital OR output;
   j) a second digital NOT circuit, connected to the second digital OR output, and having a second digital NOT output; and k) a fourth digital AND circuit, connected to the first digital OR output and to the second digital NOT output, and having an output constituting the neuron unit output.

5. A neuron unit for simultaneously processing a plurality of binary input signals on a plurality of input lines, and for outputting on a neuron unit output a neuron unit output signal which is indicative of a result of the processing, the neuron unit comprising:
   a) the plurality of input lines;
   b) a plurality of first memory devices having respective first memory outputs;
   c) a plurality of second memory devices having respective second memory outputs;
   d) a plurality of first digital NOT circuits, connected to respective second memory outputs, and having respective first digital NOT outputs;
   e) a plurality of first digital AND circuits, connected to respective input lines and to respective first memory outputs; and having respective first digital AND outputs;
   f) a plurality of second digital AND circuits, connected to respective first digital AND outputs and to respective second memory outputs, and having respective second digital AND outputs;
   g) a plurality of third digital AND circuits, connect to respective first digital AND outputs and to respective first digital NOT outputs, and having respective third digital AND outputs;
   h) a first digital OR circuit, connected to the second digital AND outputs, and having a first digital OR output;
   i) a second digital OR circuit, connected to the third digital AND outputs, and having a second digital OR output;
   j) a second digital NOT circuit, connected to the second digital OR output, and having a second digital NOT output; and
   k) a third digital OR circuit, connected to the first digital OR output and to the second digital NOT output, and having an output constituting the neuron unit output.

6. A neuron unit network, comprising:
   A) A plurality of neuron units which are coupled to form a hierarchical structure that has a plurality of layers; and
   B) a plurality of signals lines coupling neuron unit outputs of arbitrary neuron units in one layer of the hierarchical structure to a plurality of input lines of arbitrary neuron units in another layer of the hierarchical structure, each of said neuron units having a neuron unit output, each of said neuron units including:
      a) the plurality of input lines;
      b) a plurality of first memory devices having respective first memory outputs;
      c) a plurality of second memory devices having respective second memory outputs;
      d) a plurality of first digital NOT circuits, connected to respective second memory outputs, and having respective first digital NOT outputs;
      e) a plurality of first digital AND circuits, connected to respective input lines and to respective first memory outputs, and having respective first digital AND outputs;
      f) a plurality of second digital AND circuits, connected to respective first digital AND outputs and to respective second memory outputs, and having respective second digital AND outputs;
      g) a plurality of third digital AND circuits, connected to respective first digital AND outputs and to respective first digital a plurality of NOT outputs, and having respective third digital AND outputs;
      h) a first digital OR circuit, connected to the second digital AND outputs, and having a first digital OR output;
      i) a second digital OR circuit, connected to the third digital AND outputs, and having a second digital OR output;
      j) a second digital NOT circuit, connected to the second digital OR output, and having a second digital NOT output; and
      k) a fourth digital AND circuit, connected to the first digital OR output and to the second digital NOT output, and having an output constituting the neuron unit output.

7. A neuron unit for simultaneously processing a plurality of binary input signals and for outputting an output signal which is indicative of a result of the processing, said neuron unit comprising:
   a) a plurality of input lines connected to provide binary input signals which undergo transitions with time;
   b) memory means for storing:
      1) weighting coefficients; and
      2) corresponding grouping information, said grouping information indicating one of excitation and inhibition groups to which said weighting coefficients belong;
   c) first digital gate means, responsive to said memory means and said input lines, for outputting a logical product of:
      1) one of said binary input signals received from said input lines; and
      2) a corresponding one of the weighting coefficients from said first memory means;
   for each of said binary input signals;
   d) second digital gate means, responsive to said memory means, for outputting a logical product of:
      1) one of said grouping information from said memory means; and
      2) a corresponding one of logical products output from said first digital gate means;
   for each of the logical products output from said first digital gate means;
   e) third digital gate means, responsive to said memory means, for outputting a logical product of:
      1) an inversion of one of said grouping information from said memory means; and
      2) a corresponding one of the logical products output from said first digital gate means;
   for each of the logical products output from said first digital gate means;
   f) fourth digital gate means, responsive to said second digital gate means, for outputting a logical sum of logical products output from said second digital gate means;
   g) fifth digital gate means, responsive to said third digital gate means, for outputting a logical sum of logical products output from said third digital gate means; and
   h) output means including:

1) a digital inverter, responsive to said fifth digital gate means, for inverting the logical sum output from said fifth digital gate means; and
2) a digital gate, responsive to said fourth digital gate means and said digital inverter, for outputting one of
   A) a logical product of; and
   B) a logical sum of:
      i) the logical sum output from said fourth digital gate means; and
      ii) an inverted logical sum output from said digital inverter,
   said digital gate outputting the output signal of said neuron unit.

8. An apparatus including the neuron unit as claimed in claim 7, comprising:
   means for providing said binary input signals which respective describe a signal quantity in a form of a pulse density; and
   said memory means includes means for storing the weighting coefficients which respectively describe a signal quantity in a form of a pulse density.

9. The apparatus as claimed in claim 8 wherein the memory means includes means for storing each weighting coefficient having a pulse density defined by a number of first values and second values within a predetermined time, the first values and second values being arranged at random, and the first and second values respectively corresponding to high and low binary signal levels.

10. The neuron unit as claimed in claim 7 wherein said memory means includes a storage capacity of at least three bits for one weighting coefficient and a corresponding grouping information.

11. The neuron unit as claimed in claim 10 wherein said memory means includes shift registers each having a storage capacity of at least two bits for storing the weighting coefficients, and 1-bit memories for storing the grouping information.

12. The neuron unit as claimed in claim 11 wherein said memory means respectively use a content of each shift register repeatedly.

13. A neuron unit network, comprising:

A) a plurality of neuron units that are coupled to form a hierarchical structure which has a plurality of layers; and
B) a plurality of signals lines coupling neuron unit outputs of arbitrary neuron units in one layer of the hierarchical structure to a plurality of input lines of arbitrary neuron units in another layer of the hierarchical structure, each of said neuron units having a neuron unit output, each of said neuron units including:
   a) the plurality of input lines;
   b) a plurality of first memory devices having respective first memory outputs;
   c) a plurality of second memory devices having respective second memory outputs;
   d) a plurality of first digital NOT circuits, connected to respective second memory outputs, and having respective first digital NOT outputs;
   e) a plurality of first digital AND circuits, connected to respective input lines and to respective first memory outputs; and having respective first digital AND outputs;
   f) a plurality of second digital AND circuits, connected to respective first digital AND outputs and to respective second memory outputs, and having respective second digital AND outputs;
   g) a plurality of third digital AND circuits, connect to respective first digital AND outputs and to respective first digital NOT outputs, and having respective third digital AND outputs;
   h) a first digital OR circuit, connected to the second digital AND outputs, and having a first digital OR output;
   i) a second digital OR circuit, connected to the third digital AND outputs, and having a second digital OR output;
   j) a second digital NOT circuit, connected to the second digital OR output, and having a second digital NOT output; and
   k) a third digital OR circuit, connected to the first digital OR output and to the second digital NOT output, and having an output constituting the neuron unit output.

* * * * *